Patented Sept. 10, 1929.

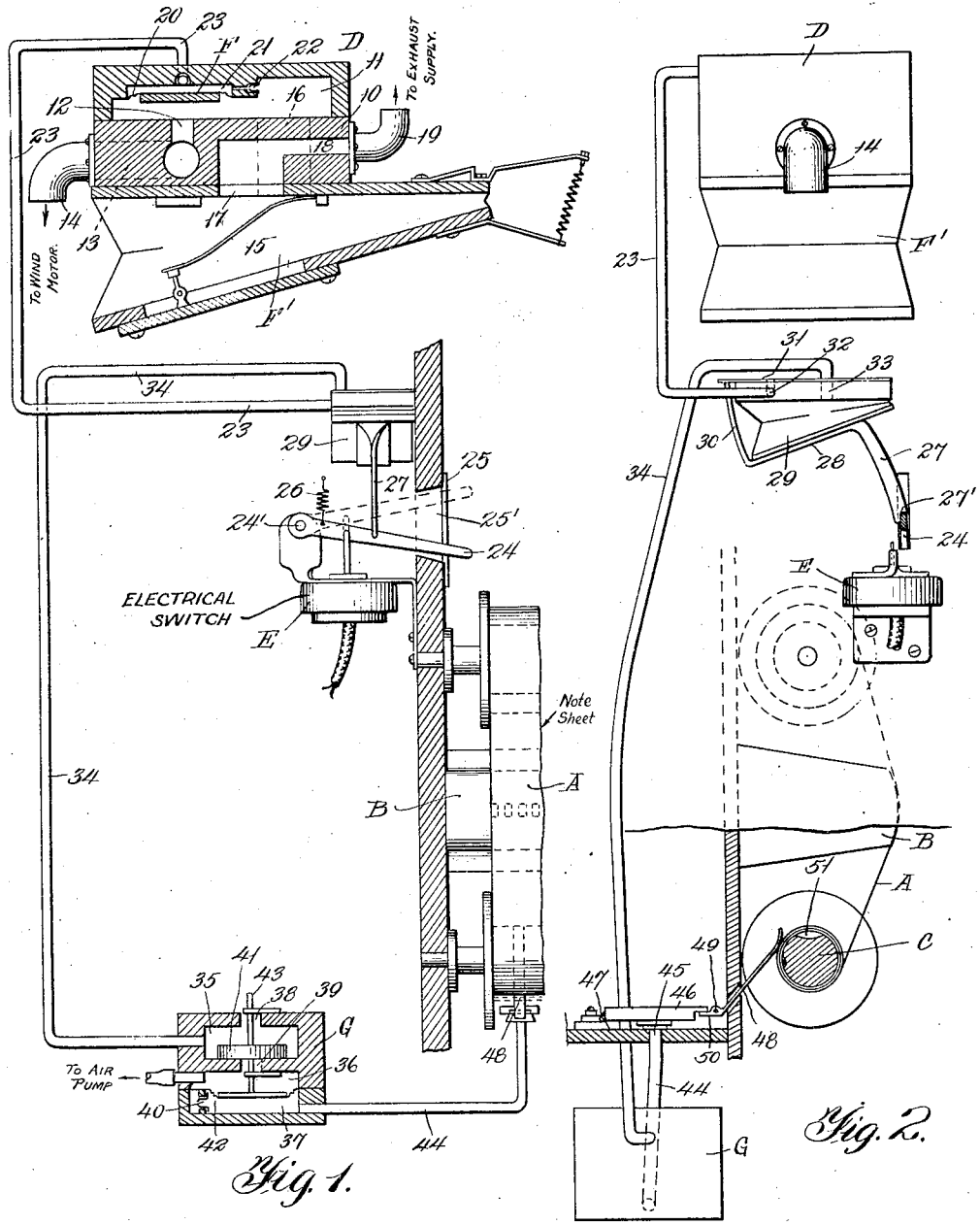

1,727,809

UNITED STATES PATENT OFFICE.

TOLBERT F. CHEEK, OF NEW YORK, N. Y., ASSIGNOR, BY MESNE ASSIGNMENTS, TO WELTE-MIGNON CORPORATION, OF NEW YORK, N. Y., A CORPORATION OF DELAWARE.

STOPPING MECHANISM FOR RECORD-CONTROLLED MUSICAL INSTRUMENTS.

Application filed January 28, 1924. Serial No. 689,399.

This invention has reference to that type of record controlled musical instruments in which there is an electric motor which operates a pneumatic pumping mechanism for producing within the system the air tensions necessary for the operation of the instrument and a wind motor controlled by said air tensions for operating the mechanism which unrolls and rerolls the note sheet or record. It particularly relates to improvements in the means hitherto proposed for cutting off communication of said wind motor with the pumping means simultaneously with the opening of the circuit to the electric motor, the means referred to being intended to prevent overrunning of said wind motor.

The disadvantages of such overrunning of said wind motor or, in other words, the benefits which will accrue from the stoppage of said motor at the instant the re-rolling operation of the note sheet—hereinafter called "record"—has been completed are sufficiently known to make it unnecessary to set forth the same herein.

It is, of course, important in the particular type of player mechanisms hereinbefore referred to that the electric motor and the wind motor stop at the same instant at the end of the rewinding operation of the record. It has been proposed to accomplish this desirable result by providing between the pneumatic pump and the wind motor a cut off valve controlled by means so correlated with the actuating means for the switch which operates the electric motor that these two means will be operated to open the circuit to the electric motor and to close the cut off valve simultaneously.

One of the important purposes of this invention is to provide an improved organization of elements of such nature that the intended result may be secured with certainty by means of very simple and economical kind.

In prior proposals, there has been a positive connection between the switch which controls the circuit to the electric motor and the means for controlling the pneumatic tensions which close the cut-off valve, so that the closing of the cut-off valve was dependent upon the operation of the means for opening the circuit to the electric motor. Inasmuch as a purpose of mechanisms of this character is to prevent overrunning of the wind motor which is under control of the cut-off valve, it is desirable to assure closure of said valve even though for any reason the switch-operating mechanism fails to open the circuit to the electric motor at the moment intended.

Therefore, it is a further important purpose of my invention to so correlate the control means for the cut-off valve and the control means for the electric switch that the control means for said valve will be operative to cause said valve to be closed independently of the operation of the control means for causing the circuit to the electric motor to be opened. By this correlation of parts, I assure, and it is one of my purposes to so assure, a more certain and rapid closing of the cut-off valve from a pneumatically-operable control motor of a given size for said valve, for the reason that the duty of positively operating the electric-switch is removed from said motor.

These purposes are secured by the construction exemplified by the accompanying figures of drawing, whereof:—

Fig. 1 is a diagrammatic representation of the preferred embodiment of the invention; and Fig. 2 is also a diagrammatic representation of the same parts shown in Fig. 1, but viewed from a position at right angles to that from which they are seen in Fig. 1.

It has been considered to be unnecessary to illustrate the electric motor, or the pump which is operated thereby to produce the necessary exhaust tensions within the system, or to show the wind motor or the propelling mechanism for the note sheet which is operated by said wind motor, as these may be of any of the usual and well known construction, or of any construction and arrangement suitable for use in record controlled musical instruments of the type hereinbefore referred to. I have also considered it to be unnecessary to illustrate or describe the pneumatically operated mechanism for operating the instrument as such mechanism forms no part of this invention.

A designates the music roll or record; B the tracker bar; and C the spool onto which the note sheet is wound in the playing operation and from which said note sheet is wound back into its roll form during the re-rolling operation by the propelling mechanism operated by power derived from the wind motor: all as is well understood in this art.

E designates the switch to control the electric circuit which includes the electric motor for operating the pneumatic pumping mechanism, and F designates the pneumatically operable cut-off valve which is interposed in the air connections between the pumping mechanism and the wind motor which operates the propelling mechanism for the note sheet. The switch may be of any approved construction. The cut-off valve in practice may be arranged at any suitable place in the air connections but should be located as close to the wind motor as is practicable. As here shown, the said valve is arranged as a member of a governor mechanism D for said wind motor, the governor mechanism here shown being of the construction set forth in my co-pending applications for Letters Patent, filed May 7, 1921, and numbered serially, 467,648 and 467,650, respectively, and one of which applications, namely the one numbered 467,650, has matured into Patent No. 1,498,233 issued June 17, 1924.

This governor mechanism includes a body 10 having a chamber 11, a port 12, a channel 13 and a nipple 14. In practice a duct, not shown, extends from the wind motor to the nipple 14, so that the chamber 11 will have communication with said wind motor, through said duct, and the nipple 14, channel 13 and port 12 when the cut-off valve F is open. The chamber 11 is also in communication with the interior of a governor pneumatic F' having a regulator valve 15, through a channel 16, and said governor pneumatic in practice has communication with the pneumatic pump through a port 17, a channel 18 and a duct, not shown, which duct, in practice, extends to said pump from a nipple 19.

The valve F is carried by a pouch or membrane 20 whose opposite sides are subjected to the air tensions in the chamber 11 and space 21. Said space 21 is provided with a bleed opening 22 to the chamber 11 and is also provided with a duct 23 for a purpose hereinafter explained. It will be noted that the valve F is arranged to open and close the port 12 and that said port is arranged adjacent that side of the box which in actual practice is presented toward the wind motor, namely, the inlet side of the box when the mechanism is arranged to be operated upon the suction principle.

The switch E is provided with an operating member 24 pivoted at 24' and adapted to be moved in a guide opening 25' formed in a guide plate 25, manually in one direction and by a suitably arranged spring, as 26, in the opposite direction. Its manual movement closes the circuit to the electric motor and places the spring 26 under tension so that the spring becomes operative to open the circuit by restoring the operating member to its initial position when the latter has been freed from a holding member 27.

This holding member 27 is arranged in the path of movement of the member 24 and is formed with a notch at 27' to receive the member 24 when the latter is in circuit closing position. It is mounted to be movable to permit the member 24 to pass when the latter is being moved manually to close the circuit to the motor. It is resiliently held into operative relation with said member. As here shown, it is carried by the movable member 28 of a pneumatic 29. A member 30, which may be integral with the member 27, has one of its ends engaged with a flat spring 31, which spring imposes pressure on the member 30 and also acts as a valve to close a port 32 to which the duct 23 extends from the space 21 in the governor unit. This port 32 has no communication with the interior of the motor pneumatic 29. A second port, 33, which has communication with the interior of said motor pneumatic, is connected with a duct 34 which is controlled from the record. The means which I prefer for controlling this duct includes a box G having a chamber 35 from which the duct 34 leads; and also having chambers 36 and 37, an atmospheric port 38 leading to the chamber 35, a suction port 39 between said chamber 35 and the chamber 36, a bleed opening 40 between the chambers 36 and 37, a valve 41 operative to open the suction port 39 and close the atmospheric port 38 or to open the atmospheric port 38 and close the suction port 39, and a pouch 42 arranged between the chambers 36 and 37 and operatively related to the stem 43 of said valve so as to operate the latter.

The chamber 37 is connected by a duct 44 with an atmospheric port 45. This atmospheric port 45 is opened and closed by a valvular member 46, one end of which is pivoted, as at 47, and the other end of which is operatively related to an arm 48 which is pivoted at 49 and has one of its ends arranged to drop into an aperture 51 formed in the spool C and its other end, 50, in operative relation with the valve 46, so as to raise the latter and uncover the port 45 when the free end of the arm drops into said aperture 51.

It will be understood that when the record has been inserted and its free end attached to the spool C, it will cover the notch 51 in the spool C and will hold the free end of the arm 48 out of the notch during the feeding operation of the record and until the end of the rewind operation has been reached. When the record has been properly attached to the spool C for the feeding operation, the operator moves the switch-operating member 24 to close the circuit through the electric motor and thereby start the pumping mechanism into operation to create the necessary exhaust tension in the system for the playing and rewinding operations. During this movement of the member 24, it presses the notched end of the holding member 27 out of its path but the resilient mounting of the latter causes it to spring forward and engage the member 24 when the notch 27' is in registration with said member. It will be understood that the wind motor is under exhaust tension through its connection to the pneumatic pump, the connections including the nipple 14, channel 13, port 12, chamber 11, channel 16, reservoir F', port 17, channel 18 and nipple 19. At this time, (the port 45 being closed by the valvular member 46 and the port 32 being closed by the flat spring 31,) the chambers 36 and 37, in member G and air space 21 in member D, and the ducts 44 and 23 will all be under exhaust tension; and the interior of the pneumatic 29 will be in communication with the atmosphere through the port 33, duct 34, chamber 35 and port 38. The pneumatic 29, being in expanded condition and being aided by the pressure of the flat spring 31 against the arm 30, operates through the holding member or latch 27 to hold the member 24 against accidental movement.

This is the condition of the parts until, at the end of the re-rolling operation the notch 51 in spool C is uncovered. At this moment, the free end of the arm 48 drops gravitationally into said notch, causing the finger 50 at its opposite end to move the valvular member 46 off the port 45. This causes an inrush of air into chamber 37 which distends the pouch 42 and moves the valve 41 to uncover the suction port 39 and close the atmospheric port 38. Duct 34 and pneumatic 29 are thus placed under exhaust tension from chamber 36 and thereupon said pneumatic collapses with the result that the holding member 27 is withdrawn from the switch actuating member 24 and the flat spring 31 is raised by the movement of the arm 30, thereby opening port 32. Member 24 being thus freed is raised by its spring 26 thus opening the circuit to the electric motor, whereupon the pumping mechanism for producing exhaust tension within the system ceases to operate. The opening of the port 32 to the atmosphere causes an inrush of air through the duct 23 and into the space 21, thereby distending the pouch 20 and moving the valve F onto the port 12, thus instantaneously cutting off communication between the wind motor and the pumping mechanism at a place adjacent the former.

Having thus described the invention, what I believe to be new and desire to secure by Letters Patent, is:—

1. In a record controlled player mechanism for musical instruments, having a circuit closing switch and a cut-off valve, the combination with said switch and valve, of means to hold the switch in circuit closing position and means having connection with said valve and switch-holding means and operative under the control of a record to cause the valve to close and the switch-holding means to be released from the switch to permit the latter to open the circuit.

2. In a record controlled player mechanism for musical instruments, having a circuit closing switch and a cut-off valve, the switch having an operating member operable manually to close it, the combination with said switch and valve, of means to open the switch, a holding member for the switch-operating member, movable relatively thereto, and a control means operable under control of a record to cause the valve to close and to release the holding member from the switch-operating member, simultaneously.

3. In a record controlled player mechanism for musical instruments, having a circuit closing switch and a cut-off valve, the switch having an operating member operable manually to close it, the combination with said switch and valve, of means to open the switch, a holding member for the switch-operating member, mounted to swing relatively thereto, and a control means operable under control of a record to cause the valve to close and to release the holding member from the switch-operating member, simultaneously.

4. In a record controlled player mechanism for musical instruments, having a circuit-closing switch and a cut-off valve, the switch having a member operable manually to close it, the combination with said switch and valve, of means to open the switch, a resiliently mounted holding-member for the switch-operating member, and a control means operable under control of a record to cause the valve to close and release the holding-member from the switch-operating member, simultaneously.

5. In a record controlled player mechanism for musical instruments, having a circuit-closing switch and a cut-off valve, the switch having a member operable manually to close it, the combination with said switch and valve, of means to open the switch, a holding-member for the switch-operating member, a record controlled pneumatic, and connections between said pneumatic and the cut-off valve and said holding member, respectively to cause the valve to close and to release the holding member from the switch-operating member, simultaneously.

6. In a record controlled player mechanism for musical instruments, having a circuit closing switch and a cut-off valve, the switch having an operating member operable manually to close it, the combination with said switch and valve, of means to open the switch, a holding member for the switch-operating member, movable relatively thereto, pneumatic connections to the cut-off valve, and means under control of a record to control said connections and to release the holding member from the switch-operating member.

7. In a record controlled player mechanism for musical instruments, having a circuit closing switch and a cut-off valve, the switch having an operating member operable manually to close it, the combination with said switch and valve, of means to open the switch, a holding member for the switch-operating member, movable relatively thereto, pneumatic connections to the cut-off valve, and means resiliently pressing the holding member toward the switch-operating member and operative under control of a record to control said connections and to withdraw the holding member from the switch-operating member.

8. In a record controlled player mechanism for musical instruments, having a circuit closing switch and a cut-off valve, the switch having an operating member operable manually to close it, the combination with said switch and valve, of means to open the switch, pneumatic connections to the cut-off valve, a tensioned valve for said connections, a holding member movable relatively to the switch operating member, a pneumatic, and connections between the pneumatic and the tensioned valve and holding member, for the purposes set forth.

9. In a record controlled player mechanism for musical instruments, having a circuit closing switch and a cut-off valve, the switch having an operating member operable manually to close it, the combination with said switch and valve, of means to open the switch, pneumatic connections to the cut-off valve, a tensioned valve for said connections, a holding member movable relatively to the switch operating member, a record controlled pneumatic having a movable member connected to said holding member and carrying the same, and a rigid device connected to said movable member of the pneumatic and operatively engaged with the tensioned valve.

10. In that type of record controlled player mechanisms for musical instruments which includes a pumping mechanism, an electric motor for operating the pumping mechanism and a wind motor for operating the mechanism for unwinding and re-winding the record: means for simultaneously controlling the circuit to the electric motor and communication between the wind motor and the pumping mechanism, including a switch having a member manually operable to close the circuit to the electric motor, a valve in the air connections between the pumping mechanism and the wind motor and means under control of a record to hold said switch member during the playing and rewinding operations and to release it and to cause said valve to close communication between the pumping mechanism and the wind motor at the end of the rewinding operation, and means to open the switch when its said member is released.

11. In that type of record controlled player mechanisms for musical instruments which includes a pumping mechanism, an electric motor for operating the pumping mechanism and a wind motor for operating the mechanism for unwinding and re-winding the record: means for simultaneously controlling the circuit to the electric motor and communication between the wind motor and the pumping mechanism, including a switch having a member manually operable to close the circuit to the electric motor, a governor unit in the air connections between the pumping mechanism and the wind motor and provided with a pneumatically operable valve in its portion of the air connections operatively nearest to the wind motor, means under control of a record to hold said switch member during the playing and rewinding operations and to release it and to cause said valve to close communication between the pumping mechanism and the wind motor at the end of the rewinding operation, and means to open the switch when the said member is released.

12. In that type of record controlled player mechanisms for musical instruments which includes a pumping mechanism, an electric motor for operating the pumping mechanism and a wind motor for operating the mechanism for unwinding and rewinding the record: means for simultaneously controlling the circuit to the electric motor and communication between the electric motor and the pumping mechanism, including a switch having a member manually operable to close the circuit to the electric motor, a pneumatically operable valve in the air connections between the pumping mechanism and the wind motor, a latch to hold said switch member during the playing and rewinding operations, a pneumatic operative to disconnect the latch from the switch member and to control said valve, means under control of a record to cause the pneumatic to operate to disengage the latch from the switch member and to cause the valve to close simultaneously at the end of the rewinding operation, and means to open the switch when its said member is released.

13. In that type of record controlled player mechanisms for musical instruments which includes a pumping mechanism, an electric motor for operating the pumping mechanism and a wind motor for operating the mechanism for unwinding and rewinding the record: means for simultaneously controlling the circuit to the electric motor and communication between the electric motor and the pumping mechanism, including a switch having a member manually operable to close the circuit to the electric motor, a pneumatically operable valve in the air connections between the pumping mechanism and the wind motor, a latch to hold said switch member during the playing and rewinding operations, a pneumatic operative to disconnect the latch from the switch member, a duct to control the tension of the air at one side of the valve, a spring tensioned member to control said duct and in cooperation with the pneumatic to hold the latch in engagement with said switch member, means under control of a record to control said pneumatic to open said duct and to release the latch from the switch member, and means to open the switch when its said member is released.

14. In a record controlled player mechanism for musical instruments, the combination of a circuit closing switch, a member operative to close the switch, a cut-off valve, an element operatively related to the switch-closing member to hold the same in switch-closing position, a pneumatic, a connection between said pneumatic and the element which holds the switch-closing member in switch-closing position, said connection being operative under control of the pneumatic to release said element from its holding relation to the switch-closing member, other connections between the pneumatic and the cut-off valve to control the latter, means under control of a record to control said pneumatic, and means to open the switch-closing member when it has been released from the holding member.

15. In a record controlled player mechanism for musical instruments, the combination of a circuit closing switch, a member operative to close the switch, a cut-off valve, a pneumatic, connections under control of the record to control said pneumatic, connections under control of the pneumatic to control the cut-off valve, a member to releasably hold the switch-closing member in switch-closing position, connections between said holding member and the pneumatic to cause the former to be released from the switch-closing member under control of the pneumatic, and means connected to said closing member to open the switch when the holding member has been released from the closing member.

16. In a record controlled player mechanism for musical instruments, the combination of a circuit closing switch, a member operative to close the switch, a cut-off valve, a pneumatic, connections under control of the record to control said pneumatic, connections under control of the pneumatic to control the cut-off valve, the latter connections including a resilient valve, a latch carried by the pneumatic and having an extension engaged by said resilient valve, the end of the latch opposite the extension being arranged to releasably engage the switch-closing member and to be released from such engagement under control of the pneumatic, and means to open the switch when the switch-closing member has been released from its engagement with the latch.

In testimony whereof I affix my signature.

TOLBERT F. CHEEK.